(12) United States Patent
Worrell et al.

(10) Patent No.: US 8,069,133 B2
(45) Date of Patent: Nov. 29, 2011

(54) DECOMPOSING HUMAN BEHAVIOR INTO QUANTIFIED LAYERS OF PERCEPTION

(75) Inventors: Charles A. Worrell, Annapolis, MD (US); Craig J. Petrun, Potomac, MD (US)

(73) Assignee: The Mitre Corporation, Mclean, VA (US)

(*) Notice: Subject to any disclaimer, the term of this patent is extended or adjusted under 35 U.S.C. 154(b) by 919 days.

(21) Appl. No.: 12/021,595

(22) Filed: Jan. 29, 2008

(65) Prior Publication Data

US 2009/0192974 A1    Jul. 30, 2009

(51) Int. Cl.
  *G06F 17/00* (2006.01)
  *G06N 7/00* (2006.01)
  *G06N 7/08* (2006.01)
(52) U.S. Cl. ...................................... 706/53
(58) Field of Classification Search .............. 706/53
   See application file for complete search history.

(56) References Cited

U.S. PATENT DOCUMENTS 6,212,502 B1 *  4/2001  Ball et al. .................. 704/270
2007/0286072 A1 * 12/2007  Baumard .................. 370/229

OTHER PUBLICATIONS

Decomposing human behavior into quantified layers of perception: Worrell, 2007, IEEE, 1-4244-0991-8, pp. 267-271.*
Artificial intelligence A modern approach: Russell, 2003, Pearson Hall.*
The Borda count and agenda manipulation: Dummett, 1998, Social Choice and Welfare, Springer-Verlag.*
F. Herzberg et al., *The Motivation to Work*, New York, NY, John Wiley and Sons, pp. 44-89 (2$^{nd}$ ed., 1959).
Sirkin et al., The Hard Side of Change Management, Harvard Business Review, pp. 1-10 (Oct. 1995).
A. Rafferty et al., Perceptions of Organizational Change: A Stress and Copy Perspective, Journal of Applied Psychology, vol. 91, No. 5, pp. 1154-1162 (2006).

* cited by examiner

*Primary Examiner* — Omar Fernandez Rivas
*Assistant Examiner* — Peter Coughlan
(74) *Attorney, Agent, or Firm* — Sterne, Kessler, Goldstein and Fox, PLLC

(57) ABSTRACT

A method, computer program product, and system are provided for decomposing human behavior into quantifiable layers of perception. The method for decomposing human behavior into quantifiable layers of perception may be referred to as "DAP-E," which is an acronym representative of four main phases of the method. Theses phases include the following: decompose; aggregate; propagate; and, evaluate. For example, an embodiment of the method may include aggregating one or more outputs from one or more behavioral models to represent a statistically significant conclusion and propagating the conclusion across a social network to allow opinions of a first entity within the social network to influence a conclusion of a second entity. A token passing behavior algorithm may be used to weigh an opinion of an entity receiving a token when propagating the conclusion across the social network.

18 Claims, 9 Drawing Sheets

500

| Relationship | Weighting Factor |
|---|---|
| Person of Special Trust | 3 |
| Supervisor | 2 |
| Other people | 1 |

| Frequency of Contact | Weighting Factor |
|---|---|
| Weekly | 1 |
| Monthly | 0.5 |
| Less Frequent | 0.25 |

Figure 6

| Model | Output Format |
|---|---|
| Job Motivation Model | Binary value of "benefit" or "harm" with a percent confidence score between 0 and 100 |
| DICE Score Model | Integer score between 7 and 28 |
| Summing Algorithm | Real number |
| Stress and Coping Model | Integer score between 4 and 11 |

| Receiver's Starting Condition | Week 1 | Week 2 | Week 3 |
|---|---|---|---|
| Receiver's Starting Condition<br><br>0 | Weekly contact with a supervisor expressing support<br><br>+2<br><br>Monthly contact with a casual colleague expressing support<br><br>+0.5<br><br>Infrequent contact with 3 colleagues expressing opposition<br><br>-0.75 | Weekly contact with a supervisor expressing support<br><br>+2<br><br>Infrequent contact with a person of special trust expressing opposition<br><br>-0.75 | Weekly contact with a supervisor expressing support<br><br>+2<br><br>Monthly contact with a casual colleague expressing opposition<br><br>+0.5<br><br>Infrequent contact with 5 colleagues expressing opposition<br><br>-1.25 |
| Resulting Impact of Social Chatter<br><br>0 | +1.75 | +1.25 | +0.25 |

DECOMPOSING HUMAN BEHAVIOR INTO QUANTIFIED LAYERS OF PERCEPTION

BACKGROUND

1. Field

The present invention relates generally to representing and predicting human behavior into layers of perception.

2. Background

Predicting aspects of human and organizational behavior is an integral task in accurately predicting the performance of large groups of people. The variability and independence exhibited by people are often difficult to represent accurately in virtual environments, such as predictive simulations. Many challenges exist for researchers to predict human and organizational behavioral change based on quantitative methods and studies. For instance, researchers have difficulty in predicting whether an individual will change his behavior under particular organizational scenarios. Further, predicting changes at the organizational level is even more complex than understanding changes at the individual level. However, predicting human behavior under changing conditions is a beneficial tool for observers who must make decisions based on an understanding of how people will behave under changing conditions.

The accurate prediction of human behavior may be applied to a wide range of applications, including organizational change. For instance, predictions of human behavior may be used by policy makers to estimate changes in migrant behavior resulting from deterrent actions and modifications in a country's immigration policies. The predictions may be used to assess behavior by specific demographic groups within the country's immigrant population. In another example, predictions of human behavior may be used by military personnel to assess a candidate's perception on a particular military program. Military personnel may use this information to determine whether modifications need to be made in recruiting policies. In light of these applications, it is beneficial for decision makers to have access to predictive information on human behavior so that policies and rules may be implemented effectively.

Accordingly, what is desired is an accurate means of decomposing human behavior into quantifiable layers of perception so that decision makers may estimate decisions and conclusions made by people, affected by changes in various scenarios and situations, based on these perceptions.

SUMMARY

Embodiments of the invention include a method for decomposing human behavior into quantifiable layers of perception. The method may include aggregating one or more outputs from one or more behavioral models to represent a statistically significant conclusion and propagating the conclusion across a social network to allow opinions of a first entity within the social network to influence a conclusion of a second entity. The method may also include updating the one or more behavioral models based on new data. In aggregating the one or more outputs, the one or more behavioral models, which may be from a field of psychology, may be correlated to one or more layers of perception relating to a topic of interest. Further, the outputs may be aggregated using a Bayesian belief network to calculate an impact that the one or more outputs have on beliefs of a decision maker. A token passing behavior algorithm may be used to weigh an opinion of an entity receiving a token when propagating the conclusion across the social network. An increase in a percent confidence score from the Bayesian belief network may result from an aggregation of updated behavioral model outputs.

Embodiments of the invention additionally include a computer program product comprising a computer-usable medium having computer program logic recorded thereon for enabling a processor to decompose human behavior into quantifiable layers of perception. The computer program logic may include a means to aggregate one or more outputs from one or more behavioral models to represent a statistically significant conclusion and a means to propagate the conclusion across a social network to allow opinions of a first entity within the social network to influence a conclusion of a second entity. Additionally, the computer program logic may include a means to update the one or more behavioral models based on new data.

Embodiments of the invention further include a system capable of decomposing human behavior in quantifiable layers of perception. The system may include a first module to aggregate one or more outputs from one or more behavioral models to represent a statistically significant conclusion and a second module to propagate the conclusion across a social network to allow opinions of a first entity within the social network to influence a conclusion of a second entity. Further, the system may also include a third module to update the one or more behavioral models based on new data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 5 illustrates weighting factors for a relationship factor applied in a Summing Algorithm, according to an embodiment.

FIG. 6 illustrates weighting factors for a frequency of contact factor applied in a Summing Algorithm, according to an embodiment.

FIG. 7 illustrates types and values of outputs that may result from behavioral models associated with one or more layers of perception in an organizational change, according to an embodiment.

FIG. 9 illustrates an impact of Social Chatter as a function of time, according to an embodiment.

Figure 1:
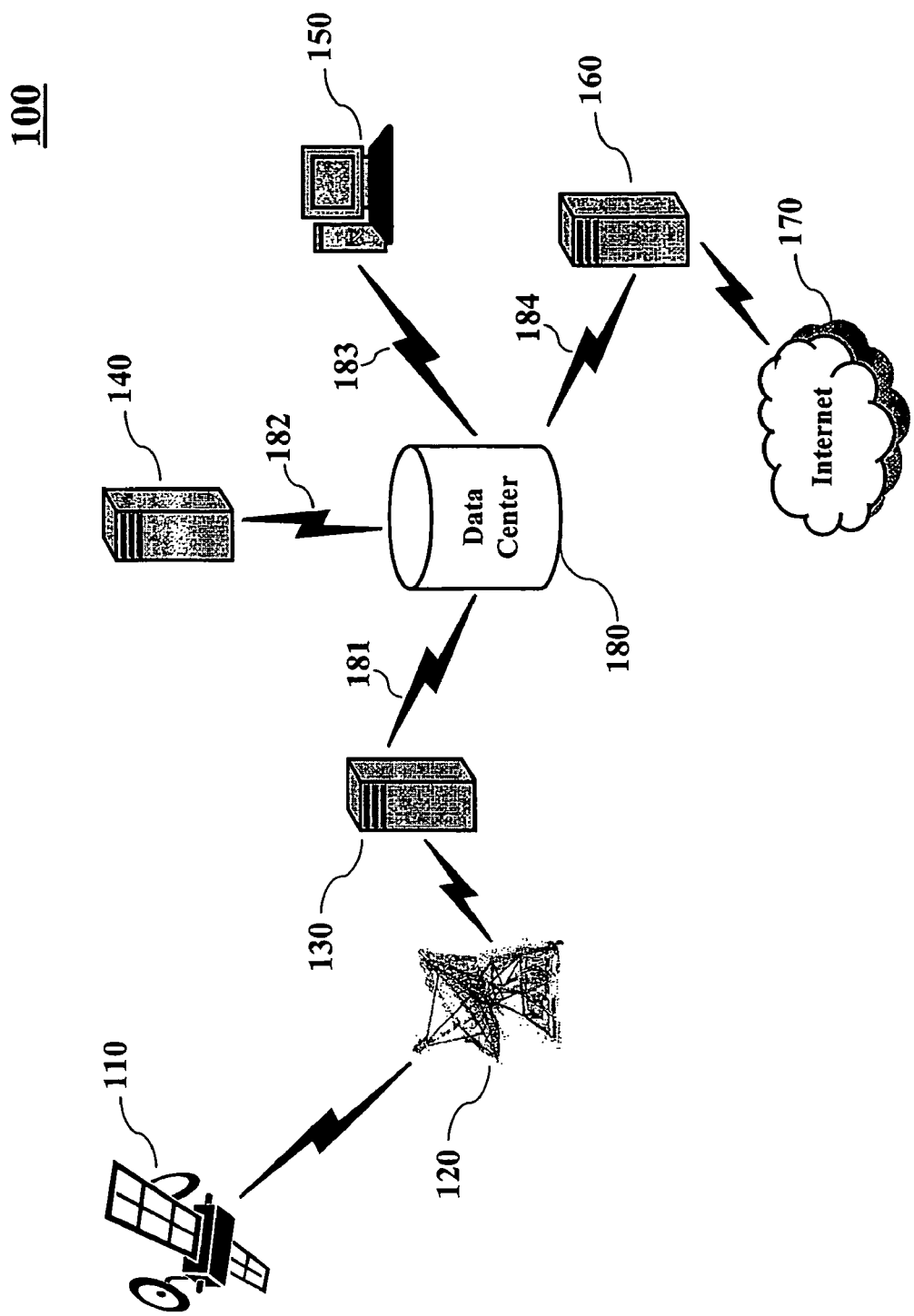
FIG. 1 illustrates an embodiment of an enterprise information system in which the present invention may be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

One example of an application where a decomposition of human behavior may be valuable is a simulation of human perception during an organizational change. As the pace of organizational change has increased due to external factors (e.g., global economies, distributed labor, and rapidly changing marketplaces and skills), so has the complexity of providing recommendations or solutions to companies seeking to successfully implement change. Traditionally, theories of organizational performance have been mostly viewed as a "closed" system, which are independent from their environment. However, to more accurately predict human perceptions on organizational change, theories on an "open" system must be considered in order to account for the external factors mentioned above.

Open system models provide sufficient evidence that decompose and align with various components of an organization. These models are critical for predicting the outcome of organizational change. Thus, in order to develop accurate simulation models of human behavior in organizational environments, it is necessary to decompose the behavior of individuals and organizations into several different layers. These different layers of perception may be represented quantitatively through the use of discrete behavioral models.

FIG. 1 illustrates an example embodiment of an enterprise information system 100 in which the present invention may be implemented. Enterprise information system 100 includes a data center 180 and network connections 181-184 to various locations and hierarchies of an organization. Data center 180 may provide a technology platform to enable an organization to integrate and coordinate business processes across all functional levels and management hierarchies.

Network connections 181-184 may be either public or private connections, where connections 181-184 may transfer information to data center 180 from regional locations or from locations far away. For example, network connection 181 may provide data center 180 information from a distant location via a satellite 110, a satellite receiver 120, and a server 130. Network connection 182 may be a wide area network connection to provide information to data center 180 from a broad geographic area, such as metropolitan or regional boundaries. Moreover, network connection 183 may be a local area network to provide information to data center 180 from a small geographic area, such as a group of buildings surrounding data center 180. Network connection 184 may provide information to data center 180 via an internet 170 and a server 160, where this connection may either be a public internet connection or a private intranet connection (e.g., corporate network). Those skilled in the relevant art will recognize that other types of network connections may be implemented to provide information to data center 180 based on the discussion given herein. These other types of network connections are within the scope and spirit of the present invention.

Figure 2:
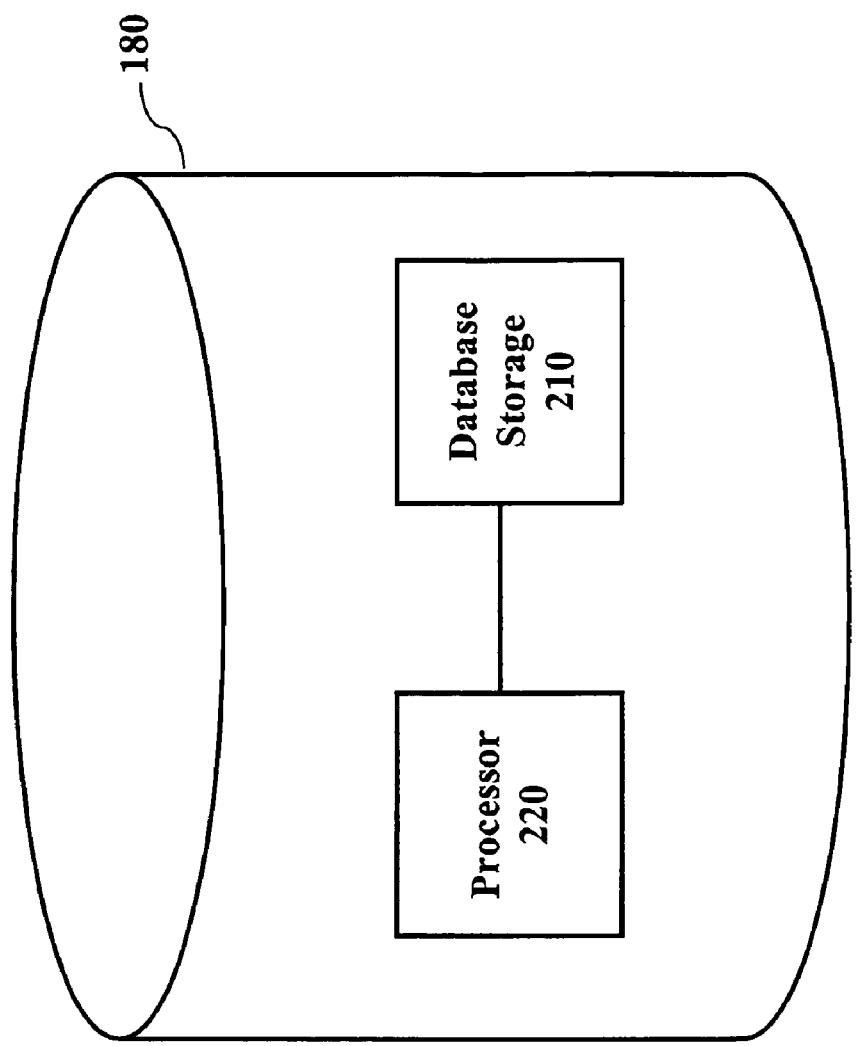
FIG. 2 illustrates an embodiment of a data center in which the present invention may be implemented.

Data center 180 includes a database storage 210 and a processor 220, as illustrated in FIG. 2. Processor 220 may execute enterprise software to solve problems confronting the organization, in an embodiment of the present invention. For example, processor 220 may execute enterprise software relating to an analysis of employee perception on organizational change. Behavioral models may be used to analyze employee perceptions, where these behavioral models may be gathered by data center 180 from various sources. These sources may include the following: an office location in another country, where information may be transferred via satellite 110; an office location within close proximity to data center 180, where information may be transferred through a local area network such as network connection 183; or, an internet connection such as network connection 184. The information gathered from these various sources and locations may be stored in database storage 210, such that processor 220 may access the information when executing the enterprise software. Those skilled in the relevant art will appreciate that the enterprise software may be executed at a location other than data center 180; for example, the enterprise software may be executed at a remote location.

Figure 3:
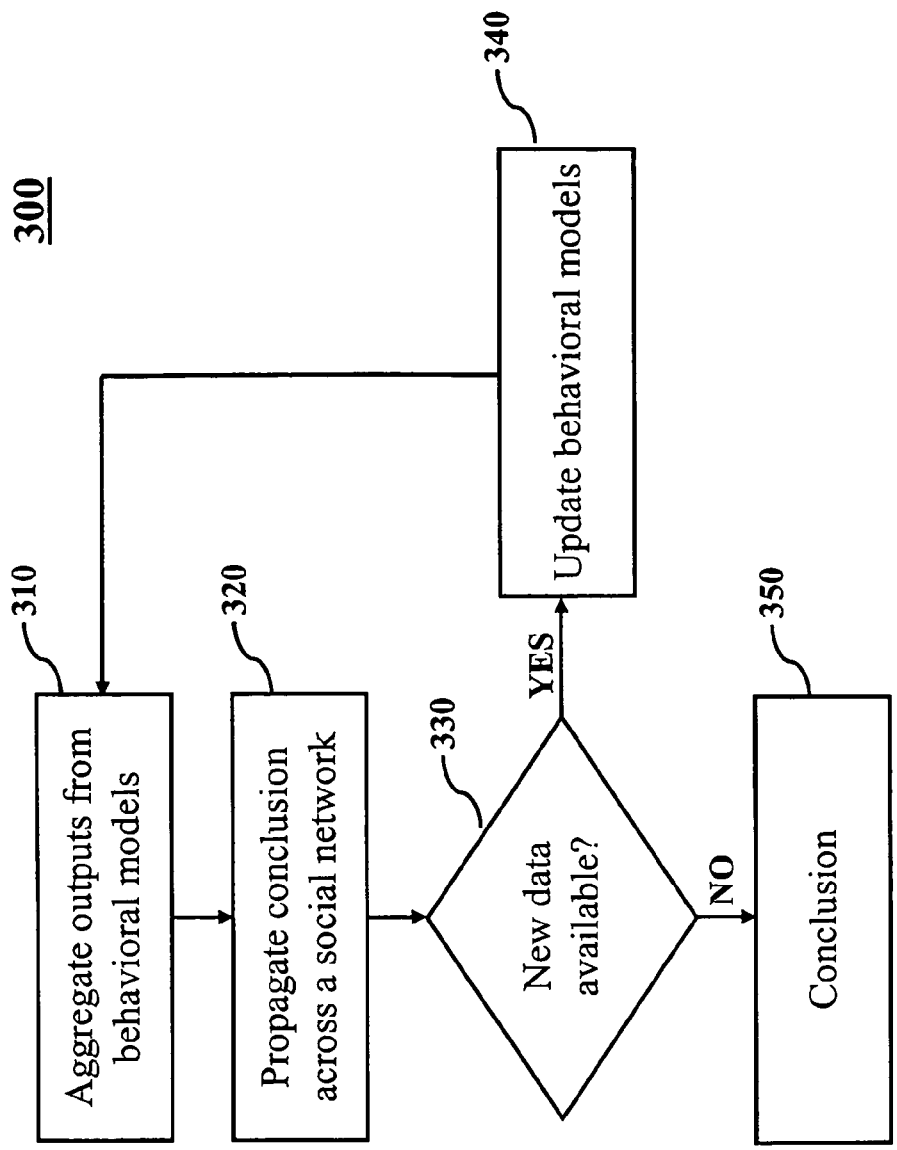
FIG. 3 illustrates an embodiment of a method for decomposing human behavior into quantifiable layers of perception.

FIG. 3 illustrates an embodiment of a method 300 for decomposing human behavior into quantifiable layers of perception. Method 300 may also be referred to as "DAP-E," which is an acronym representative of four main phases of method 300. These phases include the following: decompose; aggregate; propagate; and, evaluate. Method 300 may occur using, for example, enterprise information system 100. Decision makers, such as executives and managers of companies, may use an enterprise information system executing method 300 to assess the way a particular message or corporate initiative would be perceived by others. A person's reaction to the message or initiative may also be assessed over time, where the level of acceptance or compliance that a group of people may have towards the message or initiative may be assessed with method 300. Further, method 300 may be used by decision makers to evaluate an impact on acceptance if the message or initiative was communicated in a different way.

In step 310, one or more outputs from one or more behavioral models are aggregated to represent a statistically significant conclusion on a topic of interest. For example, human behavior relating to immigration policies, organizational changes, or recruiting events are topics of interest that may be decomposed into quantifiable layers of perception. For instance, in assessing whether an immigration policy would be complied with by immigrants, an immigrant contemplating an illegal crossing of another country's border may ask himself the following questions:

(1) Will I live in poverty if I stay in my home country?
(2) Can I avoid apprehension during the border crossing?
(3) Will I die during the border crossing?
(4) What does my family think about immigration?
(5) Can I find employment in the other country?
(6) Will I live in poverty in the other country?
(7) Can I avoid apprehension while in the other country?

Each of the questions above may represent a different layer of perception, where answers to these seven questions may form a basis for an immigrant's behavior in deciding whether or not to illegally cross the border into another country.

In another example, when experiencing an organizational change, an employee may ask himself the following four questions, where each question may represent a different layer of perception:

(1) How do I benefit from this change?
(2) Do I expect this change to be implemented successfully?
(3) What have I heard about this change from other people?
(4) Am I more inclined to change jobs because of this change?

Similar to the immigration example described above, the answers to these four questions may form a basis for a person's conclusion on whether to support or oppose the impending organizational change. Further, with respect to these four questions, psychological behavioral models that reflect relevant perceptions may be used to evaluate each question.

The specific layers of perception and behavioral models in the description of method 300, and throughout this application, are given for example purposes only and are not meant to be limiting. Those skilled in the art will recognize that other layers of perception and behavioral models for method 300 based on the description herein. These other perceptions and behavioral models are within the scope and spirit of the present invention.

Figure 4:
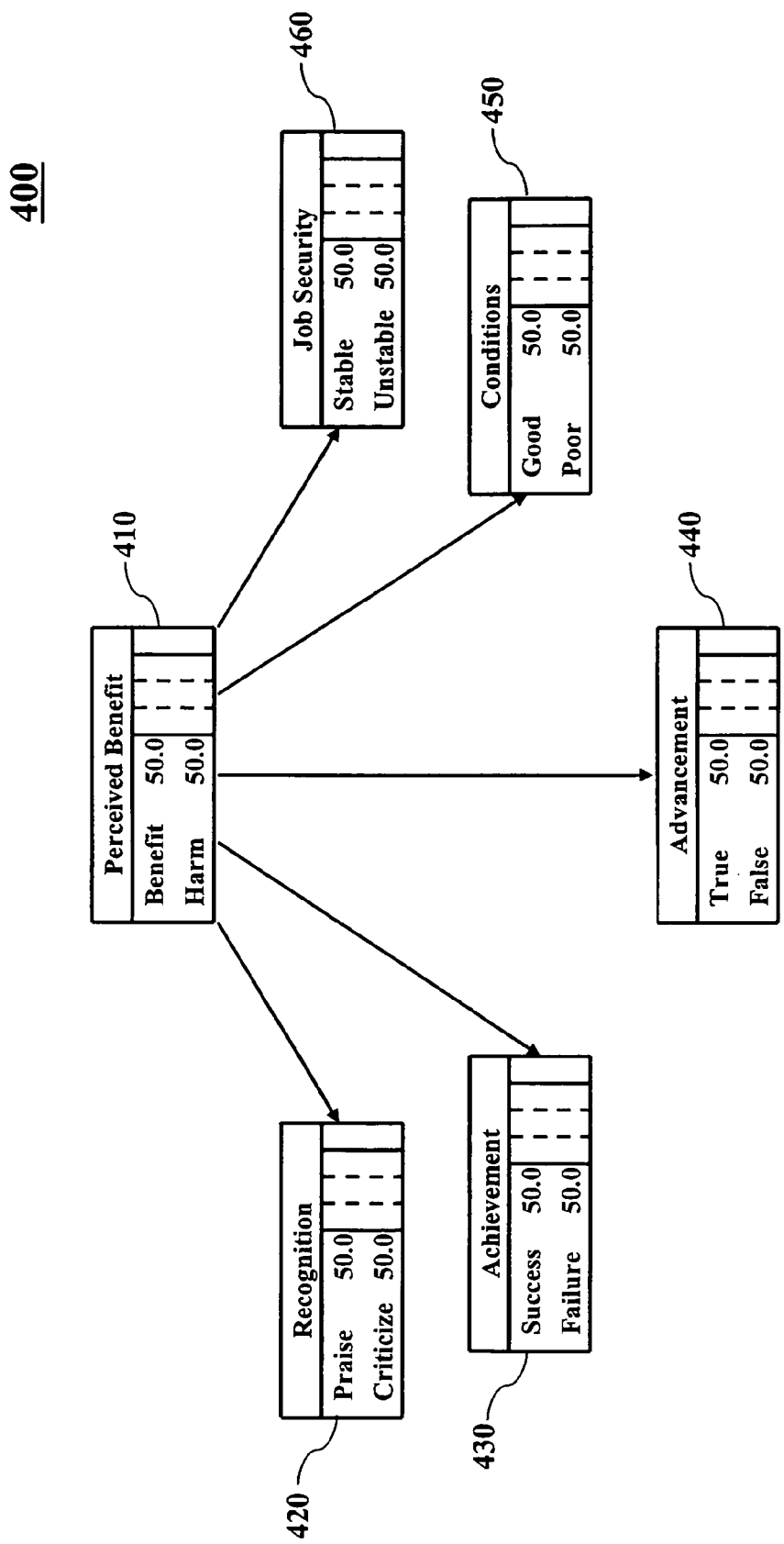
FIG. 4 illustrates a portion of a Herzberg Job Motivation Model, according to an embodiment.

With respect to the organizational change example, a Herzberg Job Motivation Model may be used to assess perception in Question (1). A portion of Herzberg's model 400 is illustrated in FIG. 4. Herzberg's model 400 represents a perceived benefit 410 that a given situation may lead to recognition 420, achievement 430, advancement 440, good job conditions 450, or stable job security 460. In the organizational change example, Herzberg Job Motivation Model 400 may be expected to perform with a hit rate of 92.6% and a false alarm rate of 3.8%. The format of the output of this model may be in the form of a binary value indicating a "benefit" or "harm" with a percent confidence score between 0 and 100. Herzberg's model 400 may be used in step 310 to represent a person's perception of whether an organizational change will benefit him. A more detailed description of Herzberg's model may be found at F. Herzberg et al., *The Motivation to Work*, New York, N.Y., John Wiley and Sons (2nd ed., 1959), which is herein incorporated by reference in its entirety.

For Question (2), a DICE Score Model may be used to assess perception. The DICE Score Model represents an impact of perceptions, such as how often a project team conducts formal reviews, how well staffed the project team is, and what increase above the normal workload the project team will experience during implementation of an organizational change. The key attributes of this model may include the following: duration between project reviews (D); integrity of project team performance (I); senior management commitment (C1); local level commitment (C2); and, effort required to implement the change (E). These key attributes comprise the DICE Score, which may be represented by the following equation:

$$\text{DICE Score} = D + 2*(I) + 2*(C1) + C2 + E \quad (1)$$

The model uses ordinal rankings of the key attributes to predict success or failure with coverage of 82% accuracy, 94% precision, and 74% recall. The format of the output of this model may be an integer score between 7 and 28. The DICE Score Model may be used in step 310 to assess whether a person perceives an organizational change will be implemented successfully. A more detailed description of the DICE Model may be found at Sirkin et al., "The Hard Side of Change Management," Harvard Business Review, pp. 1-10 (October 1995), which is herein incorporated by reference in its entirety.

For Question (3), a Summing Algorithm may be used to assess perception. This algorithm passes "tokens" of either support or opposition when a person communicates an impending change to another person. A person receiving the token will contribute his own conclusion to the impending change and then propagate the token of support or opposition to another person. The influence of each token may be weighted on the basis of three considerations: the identity of the sender (e.g., supervisor or peer); the medium of communication (e.g., in-person or email); and, the frequency of contact (e.g., weekly contact or quarterly staff meetings). For example, table 500 in FIG. 5 illustrates example weighting factors that may be used according to a type of relationship between a sender and receiver of a token. Further, table 600 in FIG. 6 illustrates example weighting factors according to the frequency of contact between the sender and receiver.

As the tokens are passed through a social network within the organization being represented, they represent the impact of "Social Chatter." The impact of these tokens may be weighed by each person in the network receiving them. Tokens of support may have positive values, while tokens of opposition may have negative values. The accumulated value of all tokens received by a person at any point in time may be used to evaluate that person's perception of what he has heard from others regarding the impending change. The format of the output of the Summing Algorithm may be a real number. A more detailed description of the Summing Algorithm is provided below with respect to the description of step 320.

For Question (4), a Stress and Coping Model may be used to assess perception. The Stress and Coping Model represents an employee's attitude on job satisfaction and whether he has an intent to seek employment elsewhere due to an organizational change. The model studied multiple factors, such as leader support, magnitude of change, and frequency of change, and resulted in a goodness of fit index of 0.90, a root mean square error of approximation of 0.08, and a comparative fit index of 0.95 when correlating the factors to resulting attitudes of employees. A linear summing of ordinal rankings from the four factors mentioned above may be used to measure the resulting attitudes on an intention to seek employment elsewhere.

For example, the factor relating to leader support may have the following ordinal ranking to assess whether leadership in an organization protects the interests of staff:

1=Leaders give strong consideration to the best interests of the staff;

2=Leaders give sufficient consideration to the best interests of the staff; or,

3=Leaders do not sufficiently consider the best interests of the staff.

The factor relating to magnitude of change may have the following ordinal ranking to assess whether a change is incremental or transformational:

1=Incremental; or,
2=Transformational.

The factor relating to the planning of change may have the following ordinal ranking to assess whether a change has been well planned:

1=Well planned;
2=Nominally planned; or,
3=Poorly planned.

Lastly, the factor relating to frequency of change may have the following ordinal ranking to assess whether changes in an enterprise occur frequently:

1=Change occurs infrequently;
2=Change occurs moderately; or,
3=Change occurs frequently.

From the ordinal rankings given to each factor, an employee's intention to seek employment elsewhere may be calculated by the following equation:

$$\text{Turnover Intentions} = \text{Leader Support} + \text{Magnitude of Change} + \text{Planning of Change} + \text{Frequency of Change} \quad (2)$$

The output of the equation above may be an integer score between 4 and 11. A more detailed description of the Stress and Coping Model may be found at A. Rafferty et al., "Perceptions of Organizational Change: A Stress and Coping Perspective," Journal of Applied Psychology, vol. 91, no. 5, pp. 1154-1162 (2006), which is herein incorporated by reference in its entirety.

FIG. 7 illustrates an example table 700 with types and values of outputs that may result from each behavioral model associated with each layer of perception, in the organizational change example. Those skilled in the relevant art will appreciate that different types of behavioral models may be associated with not only the layers of perception described with respect to the organizational change example but also layers of perception associated with other types of human behavior (e.g., immigration policies or recruiting strategies). Once an output is calculated for each behavioral model, a Bayesian belief network may be used to aggregate an impact that the result from each model has on beliefs of a decision maker. A Bayesian belief network is a probabilistic graphical model that may represent a set of variables and their probabilistic independencies. Bayesian belief networks are known to those skilled in the relevant art.

Figure 8:
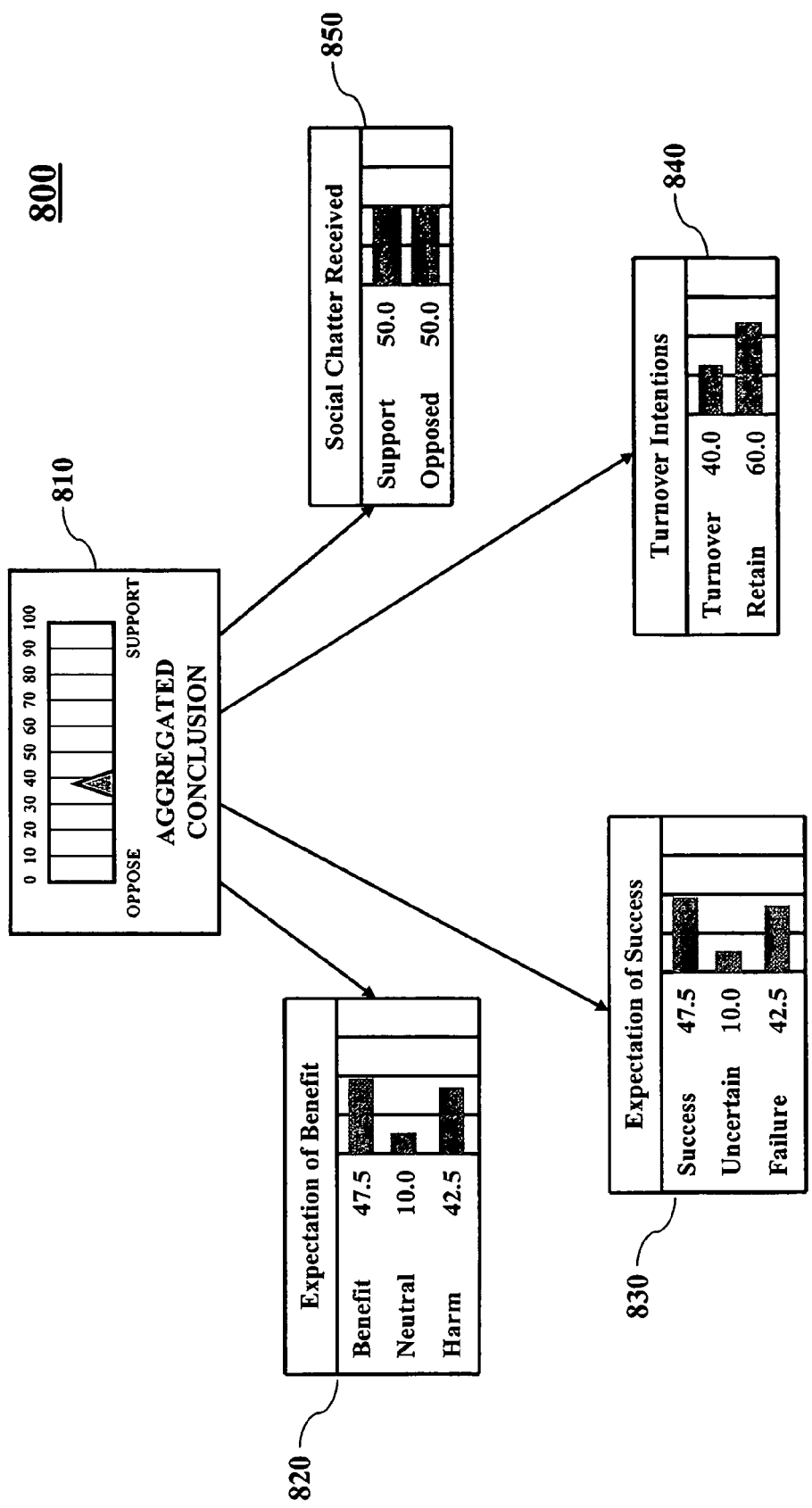
FIG. 8 illustrates an embodiment of a Bayesian belief network that considers outputs from one or more layers of perception.

FIG. 8 illustrates an example embodiment of a Bayesian belief network that considers the outputs from each separate layer of perception (i.e., from each behavioral model). Calculations may be performed with a Bayesian modeling tool, such as Netica by Norsys Software Corporation or Microsoft Bayesian Network by Microsoft Corporation. In the alternative, other types of Bayesian modeling tools may be used.

For the organizational change example described above, the output of the Bayesian modeling tool may have a binary value of "Support" or "Oppose" with a percent confidence score between 0 and 100. The outputs from the layers of perception may be considered as items of evidence that influence the beliefs of the people represented. A weighting of the layers of perception may be controlled by ratios of conditional probabilities (e.g., likelihood ratios) that may be stored in tables within the Bayesian modeling tool. In the organizational change example, conditional probabilities may reflect a subjective judgment on the impact that the perceptions may have on the beliefs of the decision maker. Examples of conditional probability tables 820-850 that may be stored in the Bayesian modeling tool are illustrated in FIG. 8.

Returning to FIG. 3, step 320 propagates a conclusion from the Bayesian belief network across a social network. In this propagation step, an opinion of a person within the social network may influence a conclusion of another person in the network regarding an impending change. Step 320 may serve as a means for estimating how the conclusions of people within a group impact each other.

In one embodiment, step 320 may be performed using a token passing behavior algorithm, where people within a social network may pass tokens of their current opinion on an issue of interest to everyone they come into contact with. A receiver of each token may then weigh the value of the opinion that has been shared on the basis of the nature of his relationship with the sender. These tokens may then be factored into a decision making process of the receiver.

For example, in returning to the organizational change example described above, an employee may support the change. The employee may communicate with a colleague his support for the change, where the colleague considers the employee as a trustworthy source of information. Further, the employee may have frequent interaction with the colleague, such as weekly communication. The value of a token, as received by the colleague, may be represented by the following formula:

$$\text{Token} = T_S * F_R * F_C \quad (2)$$

where
$T_S$=Token of support;
$F_R$=Relationship factor; and,
$F_C$=Contact factor.

In equation (2), a positive token of support ($T_S$) may be represented by "+1," whereas a negative token of support may be represented by "−1." Tables 500 and 600 in FIGS. 5 and 6, respectively, provide an example of weighted values for the relationship and contact factors. Therefore, the value of the token, as received by the colleague, may be represented by the following:

$$\text{Token} = (1)*(3)*(1) = 3 \quad (3)$$

where
$T_S$=1 (token of positive support);
$F_R$=3 (person of special trust); and,
$F_C$=1 (weekly contact).

Accordingly, if the colleague receives a message that is in opposition to the change from a casual employee who the colleague has infrequent contact with, then the value of the token may be "−0.25," where $T_S$=−1, $F_R$=1, and $F_C$=0.25. Those skilled in the relevant art will recognize that different weighting factors and values for the weighting factors may be used to express the value of the token in the token passing behavior algorithm.

Returning to FIG. 3, step 330 assesses whether new data is available for an update in the one or more behavioral models applied in step 310. For example, a change in perception may occur as a result of the propagation of a conclusion across a social network. As a token is passed from one sender to another receiver in the social network (also referred to as "Social Chatter"), the value of the token may change over time. Example table 900 in FIG. 9 illustrates an impact of Social Chatter as a function of time. An initial value of a token for a receiver may be zero, which may infer that the receiver of a message has not discussed the message with anyone. After the first week, the receiver may have discussed the message with different parties within a social network. Based on the weighting factors applied in equation (2) described above, the receiver may value tokens received from various senders differently. For example, if the receiver receives the message from a supervisor, who the receiver has weekly contact with, expressing support of the message, then the value of this token may be "+2" (e.g., $T_S$=1, $F_R$=2, and $F_C$=1). Moreover, if the receiver receives the message from three colleagues, who the receiver has infrequent contact with, expressing opposition to the message, then the composite value of this token may be "−0.75" (e.g., for each colleague, $T_S$=−1, $F_R$=1, and $F_C$=0.25). For each week, a composite value of the token may be calculated.

As illustrated in table 900, the composite value of the token may change over time due to the various interactions the receiver may have with parties in his social network. As a result of this change, the Summing Algorithm applied in step 310 may be updated periodically to reflect the change in perception.

In addition to an update to the Summing Algorithm, as new data becomes available for the behavioral models applied in step 310, these models may be updated as well. For example, data based on real-life outcomes may be applied to the behavioral models in order to increase their predictive power. An update to the behavioral models may be made in step 340.

Once updates are made to the appropriate behavioral models, updated outputs from these models may be aggregated as described with respect to step 310. As a result, the percent confidence score from the Bayesian belief network may be increased.

In step 350, if there is no change in perception due to Social Chatter or new data available for the other behavioral models, then method 300 for decomposing human behavior into quantifiable layers of perception is complete.

Figure 10:
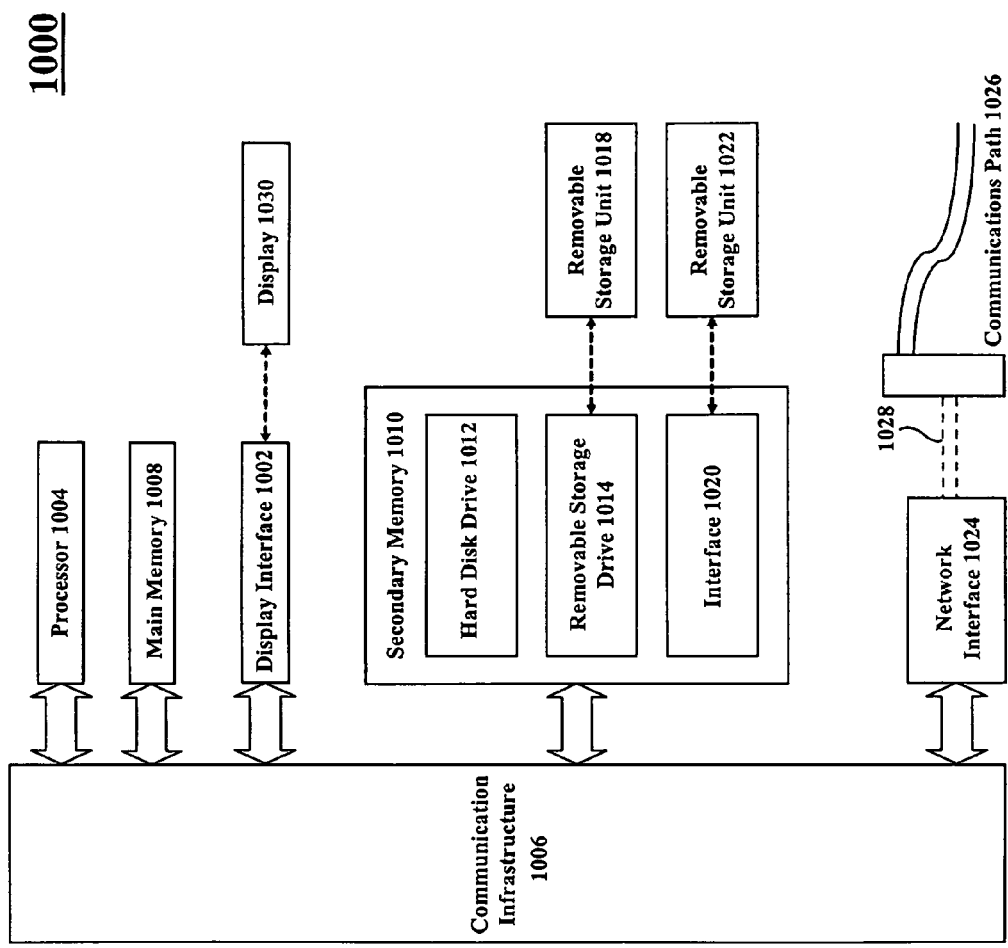
FIG. 10 illustrates an embodiment of a computer system in which the present invention may be implemented.

Various aspects of the present invention may be implemented by software, firmware, hardware, or a combination thereof. FIG. 10 illustrates an example computer system 1000 in which the present invention, or portions thereof, can be implemented as computer-readable code. For example, the methods illustrated by flowchart 300 of FIG. 3 may be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 may be a special purpose or a general purpose processor. Processor 1004 is connected to a communication infrastructure 1006 (e.g., a bus or network).

Computer system 1000 also includes a main memory 1008, preferably random access memory (RAM), and may also include a secondary memory 1010. Secondary memory 1010 may include, for example, a hard disk drive 1012, a removable storage drive 1014, and/or a memory stick. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer-usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as those found in video game devices), a removable memory chip (e.g., EPROM or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 1018, removable storage unit 1022, and a hard disk installed in hard disk drive 1012. Signals carried over communications path 1026 can also embody the logic described herein. Computer program medium and computer-usable medium can also refer to memories, such as main memory 1008 and secondary memory 1010, which can be memory semiconductors (e.g., DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowchart 300 of FIG. 3, discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012 or communications interface 1024.

The invention is also directed to computer program products comprising software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for decomposing human behavior into quantifiable layers of perception, comprising:
    (a) aggregating, by a processor, one or more outputs from one or more behavioral models to represent a statistically significant conclusion; and
    (b) propagating, by the processor, the conclusion across a social network to allow opinions of a first entity within the social network to influence a conclusion of a second entity, wherein propagating the conclusion comprises simulating a token passing behavior algorithm to weigh an opinion of an entity receiving a token.

2. The method of claim 1, further comprising:
(c) updating the one or more behavioral models based on new data.

3. The method of claim 2, wherein step (c) comprises increasing a percent confidence score from a Bayesian belief network when aggregating one or more updated outputs from the one or more behavioral models.

4. The method of claim 1, wherein step (a) comprises correlating the one or more behavioral models, from a field of psychology, to one or more layers of perception related to a topic of interest.

5. The method of claim 4, wherein the one or more behavioral models comprise a Herzberg Job Motivation Model, a DICE Score Model, a Summing Algorithm, and a Stress and Coping Model.

6. The method of claim 1, wherein step (a) comprises implementing a Bayesian belief network to calculate an impact that the one or more outputs have on beliefs of a decision maker.

7. The method of claim 6, wherein the Bayesian belief network comprises a binary output with a percent confidence score between 0 and 100.

8. The method of claim 1, wherein a value of the token is weighted by whether the token is a positive or negative token of support, a relationship between a sender of the token and a receiver of the token, and a frequency of contact between the sender and receiver.

9. A computer program product comprising a non-transitory computer-usable medium having computer program logic recorded thereon for enabling a processor to perform operations to decompose human behavior into quantifiable layers of perception, the operations comprising:
aggregating one or more outputs from one or more behavioral models to represent a statistically significant conclusion;
propagating the conclusion across a social network to allow opinions of a first entity within the social network to influence a conclusion of a second entity; and
simulating a token passing behavior algorithm to weigh an opinion of an entity receiving a token.

10. The computer program product of claim 9, the operations further comprising:
updating the one or more behavioral models based on new data.

11. The computer program product of claim 10, the operations further comprising:
increasing a percent confidence score from a Bayesian belief network when aggregating one or more updated outputs from the one or more behavioral models.

12. The computer program product of claim 9, the operations further comprising:
correlating the one or more behavioral models, from a field of psychology, to one or more layers of perception related to a topic of interest.

13. The computer program product of claim 9, the operations further comprising:
implementing a Bayesian belief network to calculate an impact that the one or more outputs have on beliefs of a decision maker.

14. A system for decomposing human behavior into quantifiable layers of perception, comprising:
a processor;
a first module, implemented on the processor, operable to aggregate one or more outputs from one or more behavioral models to represent a statistically significant conclusion; and
a second module, implemented on the processor, operable to propagate the conclusion across a social network to allow opinions of a first entity within the social network to influence a conclusion of a second entity and simulate a token passing behavior algorithm to weigh an opinion of an entity receiving a token.

15. The system of claim 14, further comprising:
a third module operable to update the one or more behavioral models based on new data.

16. The system of claim 15, wherein the third module comprises:
a module operable to increase a percent confidence score from a Bayesian belief network when aggregating one or more updated outputs from the one or more behavioral models.

17. The system of claim 14, wherein the first module comprises:
a module operable to correlate the one or more behavioral models, from a field of psychology, to one or more layers of perception related to a topic of interest.

18. The system of claim 14, wherein the first module comprises:
a module operable to implement a Bayesian belief network to calculate an impact that the one or more outputs have on beliefs of a decision maker.

* * * * *